(12) United States Patent
Jorns et al.

(10) Patent No.: US 11,620,698 B2
(45) Date of Patent: Apr. 4, 2023

(54) METHOD FOR SHARING TRAVEL DATA

(71) Applicant: FLEET NAV SYSTEMS, LLC, Holland, MI (US)

(72) Inventors: Jake Jorns, Grawn, MI (US); Thane Doremire, Holland, MI (US)

(73) Assignee: FLEET NAV SYSTEMS, LLC, Holland, MI (US)

( * ) Notice: Subject to any disclaimer, the term of this patent is extended or adjusted under 35 U.S.C. 154(b) by 588 days.

(21) Appl. No.: 16/690,504

(22) Filed: Nov. 21, 2019

(65) Prior Publication Data

US 2020/0193508 A1 Jun. 18, 2020

Related U.S. Application Data

(60) Provisional application No. 62/781,177, filed on Dec. 18, 2018.

(51) Int. Cl.
*G06F 16/25* (2019.01)
*G06Q 30/0645* (2023.01)
*H04L 67/12* (2022.01)
*H04L 67/02* (2022.01)
*H04L 12/66* (2006.01)
*G01S 19/42* (2010.01)

(52) U.S. Cl.
CPC ......... *G06Q 30/0645* (2013.01); *G06F 16/25* (2019.01); *H04L 12/66* (2013.01); *H04L 67/02* (2013.01); *H04L 67/12* (2013.01); *G01S 19/42* (2013.01)

(58) Field of Classification Search
CPC ..... G06Q 30/0645; G06F 16/25; G06F 16/27; H04L 12/66; H04L 67/02; H04L 67/12; H04L 67/1097; H04L 12/1831; H04L 2012/40273; G01S 19/42; G01S 5/0027; G01S 19/14
See application file for complete search history.

(56) References Cited

U.S. PATENT DOCUMENTS

| | | | |
|---|---|---|---|
| 8,600,783 B2 | 12/2013 | Smith et al. | |
| 8,612,273 B2 | 12/2013 | Johnson | |
| 9,288,270 B1 * | 3/2016 | Penilla | H04L 67/141 |
| 10,650,621 B1 * | 5/2020 | King | H04L 67/12 |
| 2013/0317693 A1 * | 11/2013 | Jefferies | B60R 25/24 |
| | | | 701/31.5 |
| 2019/0158353 A1 * | 5/2019 | Johnson | H04L 41/0803 |

* cited by examiner

*Primary Examiner* — Thai Nguyen
(74) *Attorney, Agent, or Firm* — The Dobrusin Law Firm, P.C.

(57) ABSTRACT

A method for sharing travel data to two sets of databases. In accordance with this invention, a Parent Customer leases vehicles to Child Customers. Travel data from the leased vehicles is directed through the Parent Customer's database first to a Gateway Server, then to a Middleware Server, then to the separate, corresponding Child Customer Databases. Child Customers, therefore, have full privacy, allowing them to see only data related to the vehicles they have rented or leased, and prohibiting future lessees from accessing data belonging to a prior lessee.

20 Claims, 3 Drawing Sheets

METHOD FOR SHARING TRAVEL DATA

CROSS-REFERENCE TO RELATED APPLICATION AND CLAIM OF PRIORITY

This application claims the benefit of, and incorporated herein for all purposes is, U.S. Provisional Patent Application Ser. No. 62/781,177; filed Dec. 18, 2018 in the name of Fleet Nav Systems, LLC and titled "Method for Sharing Travel Data."

TECHNICAL FIELD

The present invention relates generally to the acquisition, use and display of vehicle data and, more particularly, to the gathering of such data from a vehicle and providing it to entities such as rental and leasing companies, and their customers, for various purposes relating to the use, performance, location and service of the vehicle.

BACKGROUND OF THE INVENTION

Electronic logging devices collect data from a vehicle's Engine Control Unit (ECU) and offer several other built-in logging metrics, including but not limited to hours of operation, GPS tracking, g-force monitoring, and engine and battery health measurements. All of this information is stored and may be downloaded by entities authorized to access the information. This data would be much more useful to the owner of the vehicle, the manager of the vehicle's fleet, and/or their customers, if this data were able to be disseminated to the authorized recipients of the data in real time.

While technology exists to transmit data from an electronic logging device to an owning entity, rental and leasing companies often require two levels of data access. The owner of the vehicles requires access to vehicle data, as does the individual or company leasing the vehicle from the owner. In order to allow lessees to view data relative to their specific leased vehicle, data from electronic logging devices has to be separated by the leasing company to provide these customers with their own private data while simultaneously protecting the privacy of other lessees. Leasing companies often have to hire extra staff to manage and support these two levels of customers, leading to excessive costs and expenses.

Further, current laws and regulations require hours of service for particular vehicles to be logged with an electronic logging device. Without a solution to share vehicle data generated by the electronic logging device, this responsibility falls on a rental or lease provider if the subject vehicle is rented or leased. Many times, lease providers are required to hire extra staff to support customers for rented and leased vehicles to manage compliance requirements under these laws.

Finally, under traditional methods of sharing such data, once a vehicle is no longer being rented or leased, the customer's access to the vehicle data is severed. This prevents customers from managing historical data records and from being able to review past data in the event of a compliance dispute. Indefinite access to vehicle data, even after a lease term has expired, would be a valuable asset for customers.

SUMMARY OF THE INVENTION

This invention solves the problem of data accessibility for leasing companies and their customers by providing a separate database for customers of vehicle rental and leasing companies. With this invention, leasing companies no longer require large, complex group structures in their own database to allow customers to see their individual subsets of data. Customers have full access to all of their own vehicle data, viewable in their own database, and may administer user rights and access without disrupting any functionality within the leasing company's database. This invention also allows customers to have indefinite access to the data generated while they were in possession of a vehicle, well after a lease term has expired.

This invention allows customers to have total control of their own data, relieving leasing companies from responsibilities related to hours of service logs and related potential regulatory liability. As a result of the full access to data given to individual customers, liability for data tracking and reporting is fully shifted to the end customers, and away from leasing companies.

DETAILED DESCRIPTION OF THE PREFERRED EMBODIMENTS

Figure 3:
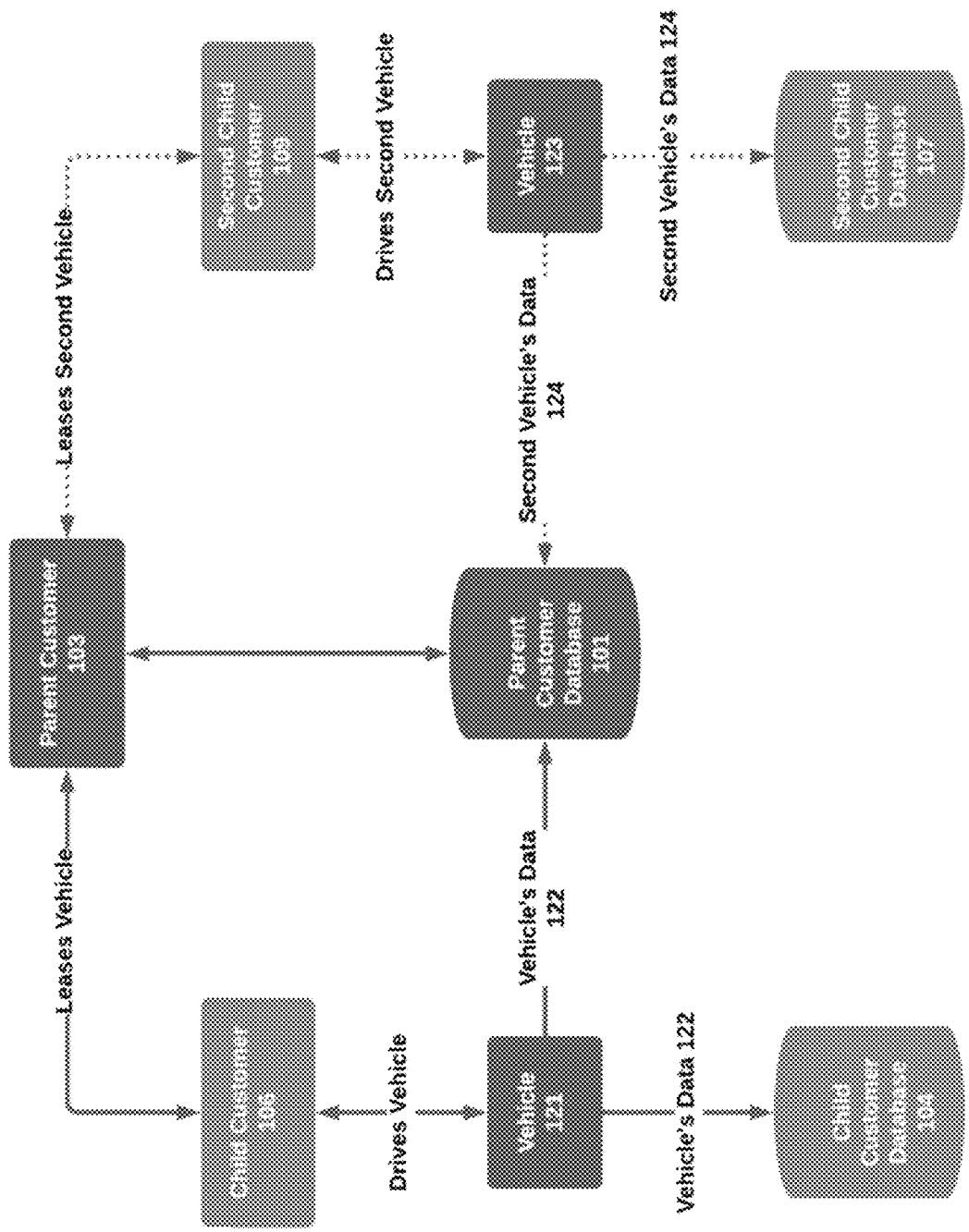
FIG. 3 is a diagram showing the relationships between the Parent Customer and Child Customer(s).

In accordance with this invention, vehicle data is delivered to two sets of databases. FIG. 3 shows the relationships between the Parent Customer 103, a leasing company, and the Child Customer 106 or 109, individuals or entities leasing vehicles from the Parent Customer 103. The Parent Customer Database 101, belongs to the Parent Customer 103. The Child Customer Database 104 belongs to the Child Customer 106. A Second Child Customer Database 107 belongs to a Second Child Customer 109. Child Customers 106 and 109 therefore have full privacy, allowing them to see only data related to the vehicles they have rented or leased, and prohibiting future lessees from accessing data belonging to a prior lessee, while allowing the Parent Customer 103 access to all of the Child Customers' 106 and 109 data in the case that troubleshooting is required.

Figure 1:
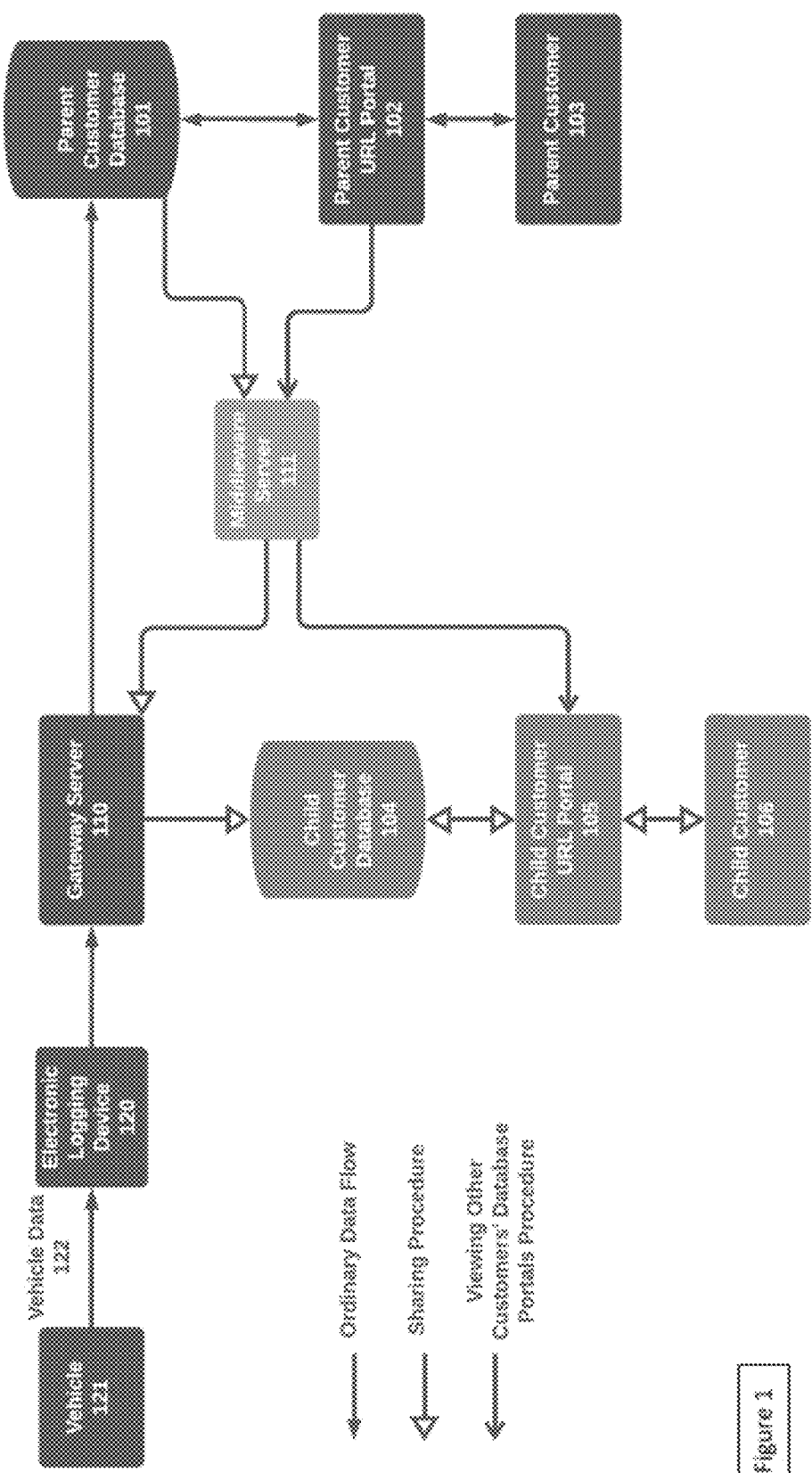
FIG. 1 is a flow chart showing the steps of an embodiment of a method for providing vehicle data to a third-party recipient and logging into the third-party recipient's database for troubleshooting, should the need arise.
Figure 2:
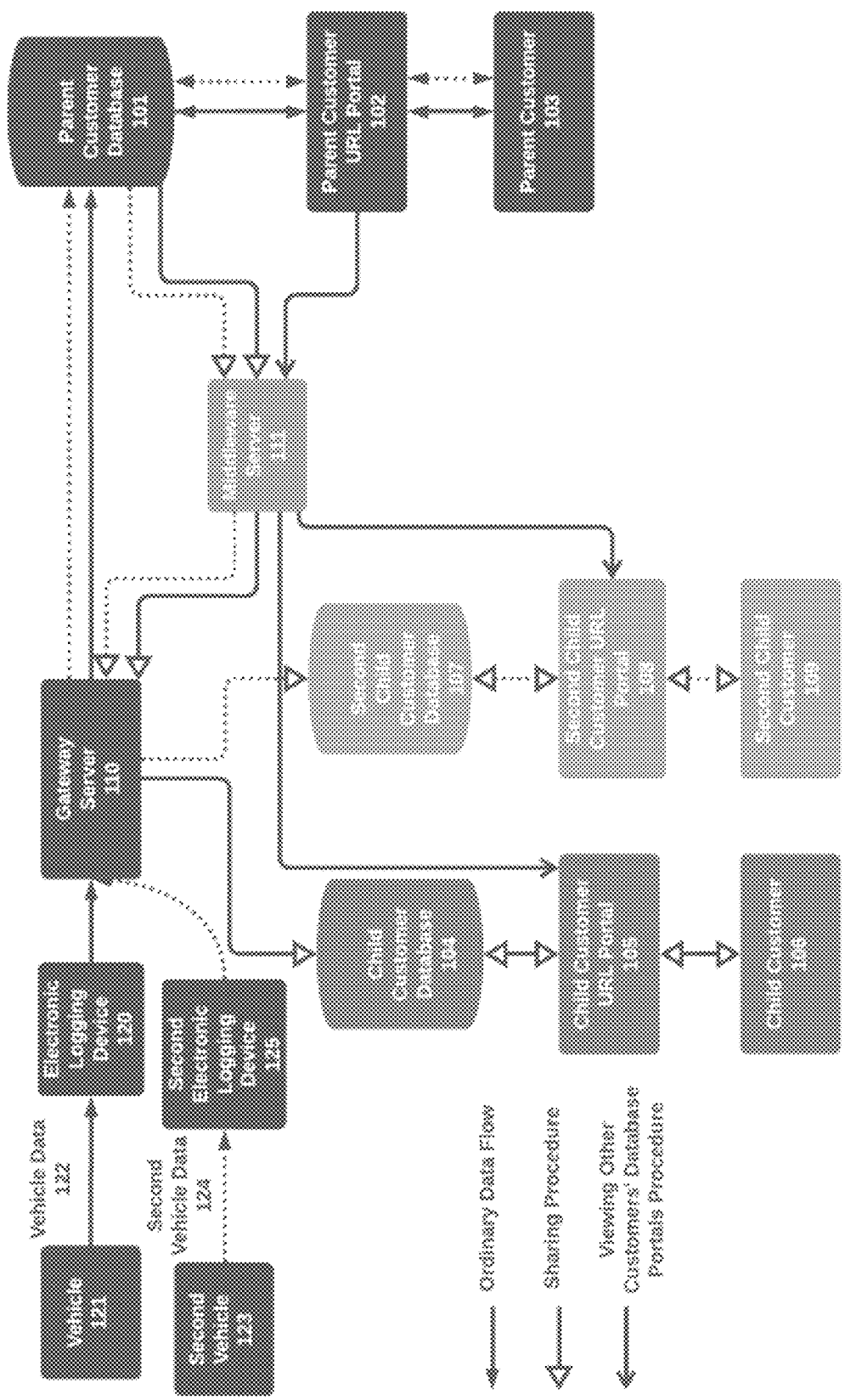
FIG. 2 is a flow chart showing the steps of an embodiment of a method of providing vehicle data for more than one vehicle to more than one thirty-party recipient and logging into said recipients' databases for troubleshooting, should the need arise.

As shown in FIGS. 1 and 2, there is provided a method of reporting vehicle data to a Parent Customer 103 and a Child Customer 106. The method includes the first step of associating a GPS function with an Electronic Logging Device 120, wherein the Electronic Logging Device 120 provides hours of operation, GPS tracking, g-force monitoring, and engine and battery health measurements, etc., for a vehicle (collectively, "Vehicle Data"). The Electronic Logging Device is then associated with a Vehicle 121, which corresponds to a Child Customer Database 104 and a Parent Customer Database 101. As the Vehicle 121 operates, the Vehicle Data 122 is recorded in the Electronic Logging Device 120 which is sent to the Gateway Server 110. The Vehicle Data 122 is pushed from the Gateway Server 110 to the Parent Customer Database 101. Once the Vehicle Data 122 is in the Parent Customer Database 101, it is transmitted to the Parent Customer URL Portal 102, for the Parent Customer 103 to view and configure in an arrangement of its choosing, which can include various graphical representations (e.g. bar graphs, line graphs, pie graphs, scatter plots), tables, and/or list views. In the case that data is to be shared to a customer, the Parent Customer Database 101 must send an API request through the Middleware Server 111 to the Gateway Server 110, instructing the Gateway Server 110 to begin sharing data with the Child Customer Database 104. Once the Gateway Server 110 begins sending Vehicle Data 122 to the Child Customer Database 104, the Vehicle Data 122 is transmitted to the Child Customer's URL Database Portal 105, for the Child Customer 106 to view and configure in an arrangement of its choosing.

In one embodiment, the association between a Vehicle 121 and its Child Customer Database 104 is limited in time. When a leasing contract ends, the Parent Customer 103 can terminate the association between the leased Vehicle Data 122 and the Child Customer Database 104, by sending another API call through the Middleware Server 111 to the Gateway Server 110 requesting that access to the Vehicle Data 122 be severed. This Vehicle Data 122 can then be assigned to a new Child Customer Database for a new lessee. In this embodiment, the Vehicle Data 122 is saved in the original Child Customer Database 104 so that first Child Customer 106 may continue to view its Vehicle Data 122 that was generated before the data link was severed after the termination of the association between the Vehicle 121 and the Child Customer Database 104.

The Vehicle Data 122 can be comprised of any number of metrics, including diagnostics, three-axis accelerometric readings and/or location data.

In another embodiment, the Parent Customer Database 101 contains Vehicle Data 122 for one Vehicle and a Second Vehicle Data 124 for a Second Vehicle 123, as shown in FIG. 2. The Vehicle Data 122 and Second Vehicle Data 124 are transmitted from the Electronic Logging Device 120 and the Second Electronic Logging Device 125, respectively, to the Parent Customer Database 101 as well as separate, corresponding Child Customer Database 104 and Second Child Customer Database 107, respectively. The Vehicle Data 122 and Second Vehicle Data 124 are transmitted from the Gateway Server 110 to the Child Customer Database 104 to the Child Customers' separate URL Database Portal 105, while the Second Vehicle Data 124 is transmitted from the Gateway Server 110 to the Second Child Customer Database 107 to the Child Customer Second's separate URL Database Portal 108, such that Child Customer 106 cannot view the Second Vehicle Data 124 belonging to Second Child Customer 109 and Second Child Customer 109 cannot view Vehicle Data 122 belonging to Child Customer 106.

The Parent Customer 103 is able to view a list of all active Electronic Logging Devices 120, containing the Electronic Logging Device names, their serial numbers, vehicles associated with the Electronic Logging Devices, and Customer Databases to which the corresponding Vehicle Data is shared on its URL Database Portal. The Parent Customer 103 can also log into any customer's database through API calls made to the Middleware Server 111 to view any data, including drivers associated with its vehicles, on its Customers' URL Database Portals. The Parent Customer's URL Database Portal 102 may be accessed by one (1) or more users, and the Parent Customer 103 can share Vehicle Data 122 to a Child Database of its choosing.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

What is claimed is:

1. A method for sharing telematics data of a Vehicle, the method comprising the steps of:
    a. Associating a Global Positioning System ("GPS") function with an Electronic Logging Device, wherein the Electronic Logging Device provides Vehicle Data, including at least one of the following: hours of operation, GPS tracking, g-force monitoring, or engine and battery health measurements, for a vehicle (collectively, the "Vehicle Data");
    b. Associating the Electronic Logging Device with the Vehicle;
    c. Associating the Vehicle with a Parent Customer Database;
    d. Associating the Vehicle with a Child Customer Database;
    e. Recording the Vehicle Data with the Electronic Logging Device;
    f. The Electronic Logging Device transmitting the Vehicle Data to a Gateway Server and then the Gateway Server transmitting the Vehicle Data to the Parent Customer Database;
    g. The Parent Customer Database transmitting the Vehicle Data from the Parent Customer Database to a Parent Customer's URL Database Portal;
    h. The Parent Customer Database requesting the Vehicle Data through use of an add-in Application Programming Interface ("API") call from the Parent Customer Database through a Middleware Server to the Gateway Server, the Parent Customer Database being accessed via the Parent Customer's URL Database Portal, requesting the Vehicle Data be transmitted from the Parent Customer Database;
    i. The Middleware Server directing the Gateway Server to transmit the Vehicle Data from the Parent Customer Database to the Child Customer Database; and
    j. The Gateway Server transmitting the Vehicle Data from the Child Customer Database to a Child Customer's URL Database Portal.

2. The method of claim 1, wherein the association between the Vehicle and the Child Customer Database is limited in time.

3. The method of claim 2, wherein the Vehicle Data is saved in the Child Customer Database, and viewable in the Child Customer's URL Database Portal after termination of the association between the Vehicle and the Child Customer Database.

4. The method of claim 2, wherein the Electronic Logging Device may be associated with a different vehicle after the association between the first Vehicle and the Child Customer Database is terminated.

5. The method of claim 1, wherein the Vehicle Data is additionally comprised of one or more of diagnostics, three-axis accelerometric readings, or location data.

6. The method of claim 1, wherein the Parent Customer Database contains Vehicle Data for two (2) or more vehicles and two (2) or more Child Databases.

7. The method of claim 6 comprising the additional steps of
   a. The Gateway Server transmitting the Vehicle Data for separate Vehicles from the Gateway Server to both the Parent Customer Database and separate, corresponding Child Customer Databases at the request of an API call made to the Gateway Server from Parent Customer Database through the Middleware Server;
   b. The Middleware Server directing the Gateway Server to transmit the Vehicle Data from the Gateway Server to the Child Databases such that no Child Customer can view the Vehicle Data belonging to a different Child Customer.

8. The method of claim 7, wherein a Parent Customer's list of all active Electronic Logging Devices contains names of Electronic Logging Devices, their serial numbers, groups associated with each Electronic Logging Device, and Customer Databases to which the corresponding Vehicle Data is shared.

9. The method of claim 7, wherein a Parent Customer can view a list of all drivers of vehicles associated with its Parent Customer Database by accessing the Child Customer Databases associated with the Vehicles.

10. The method of claim 7, wherein a Parent Customer can share Vehicle Data to a Child Database of its choosing.

11. The method of claim 1, wherein a Parent Customer's URL Database Portal may be accessed by two (2) or more users.

12. A method for sharing telematics data, the method comprising the steps of:
   a. Associating Global Positioning System ("GPS") function with two or more Electronic Logging Devices, wherein the Electronic Logging Devices provide Vehicle Data, including at least one of the following: hours of operation, GPS tracking, g-force monitoring, or engine and battery health measurements for a vehicle (collectively, "Vehicle Data");
   b. Associating the Electronic Logging Devices with separate Vehicles;
   c. Associating the Vehicles with a Parent Customer Database;
   d. Associating each Vehicle with a separate Child Customer Database;
   e. Recording the Vehicle Data with the Electronic Logging Devices;
   f. The Electronic Logging Device transmitting the Vehicle Data to a Gateway Server and then the Gateway Server transmitting the Vehicle Data to the Parent Customer Database;
   g. The Parent Customer Database transmitting the Vehicle Data from the Parent Customer Database to a Parent Customer's URL Database Portal;
   h. The Parent Customer Database requesting the Vehicle Data through use of an add-in Application Programming Interface ("API") call from the Parent Customer Database through a Middleware Server to the Gateway Server, the Parent Customer Database being accessed via the Parent Customer's URL Database Portal, requesting the Vehicle Data be transmitted from the Parent Customer Database;
   i. The Middleware Server directing the Gateway Server to transmit the Vehicle Data from the Parent Customer Database to the separate Child Customer Databases; and
   j. The Gateway Server transmitting the Vehicle Data from the Child Customer Databases to separate Child Customer URL Database Portals.

13. The method of claim 12 comprising the additional steps of
   a. The Gateway Server transmitting the Vehicle Data for separate Vehicles from the Gateway Server to both the Parent Customer Database and separate, corresponding Child Customer Databases at the request of an API call made to the Gateway Server from Parent Customer Database through the Middleware Server;
   b. The Middleware Server directing the Gateway Server to transmit the Vehicle Data from the Gateway Server to the Child Customer Databases such that no Child Customer can view the Vehicle Data belonging to a different Child Customer.

14. The method of claim 13, wherein a Parent Customer's list of the two or more Electronic Logging Devices contains names of Electronic Logging Devices, their serial numbers, groups associated with each Electronic Logging Device, and Customer Databases to which the corresponding Vehicle Data is shared.

15. The method of claim 13, wherein a Parent Customer can view a list of all drivers of vehicles associated with its Parent Customer Database.

16. The method of claim 13, wherein a Parent Customer can share the Vehicle Data to a Child Database of its choosing.

17. A method for sharing telematics data, the method comprising the steps of:
   a. Associating Global Positioning System ("GPS") functions with two or more Electronic Logging Devices, wherein the Electronic Logging Devices provide Vehicle Data, including at least one of the following: hours of operation, GPS tracking, g-force monitoring, or engine and battery health measurements, for a vehicle (collectively, "Vehicle Data");
   b. Associating the Electronic Logging Devices with separate Vehicles;
   c. Associating the Vehicles with a Parent Customer Database;
   d. Associating each Vehicle with a separate Child Customer Database, wherein the association is limited in time;
   e. Recording the Vehicle Data with Electronic Logging Devices;
   f. The Electronic Logging Devices transmitting the Vehicle Data to a Gateway Server and then the Gateway Server transmitting the Vehicle Data to the Parent Customer Database;
   g. The Parent Customer Database transmitting the Vehicle Data from the Parent Customer Database to a Parent Customer's URL Database Portal;
   h. The Parent Customer Database requesting the Vehicle Data through use of an add-in Application Programming Interface ("API") call from the Parent Customer Database through a Middleware Server to the Gateway Server, the Parent Customer Database being accessed via the Parent Customer's URL Database Portal, requesting the Vehicle Data be transmitted from the Parent Customer Database;
   i. The Gateway Server transmitting the Vehicle Data for separate Vehicles to both the Parent Customer Database and separate, corresponding Child Customer Databases at the request of an API call made to the Gateway Server from Parent Customer Database through the Middleware Server;

j. The Middleware Server directing the Gateway Server to transmit the Vehicle Data from the Gateway Server to the Child Databases such that no Child Customer can view the Vehicle Data belonging to a different Child Customer.

18. The method of claim 17, wherein the Vehicle Data is saved in the Child Customer Database, and viewable in the Child Customer's URL Database Portal after termination of the association between the Vehicle and the Child Customer Database.

19. The method of claim 17, wherein one of the two or more Electronic Logging Devices may be associated with a different vehicle after the association between the first Vehicle and the Child Customer Database is terminated.

20. The method of claim 17, wherein a Parent Customer can view a list of all drivers of vehicles associated with its Parent Customer Database.

\* \* \* \* \*